(12) United States Patent
Sato

(10) Patent No.: US 10,171,835 B2
(45) Date of Patent: Jan. 1, 2019

(54) METHOD AND APPARATUS FOR ENCODING AND DECODING IMAGE

(71) Applicant: Samsung Display Co., Ltd., Yongin-si, Gyeonggi-do (KR)

(72) Inventor: Kazushi Sato, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 168 days.

(21) Appl. No.: 15/066,990

(22) Filed: Mar. 10, 2016

(65) Prior Publication Data

US 2016/0366438 A1 Dec. 15, 2016

(30) Foreign Application Priority Data

Jun. 12, 2015 (KR) .................. 10-2015-0083703

(51) Int. Cl.
*H04N 19/593* (2014.01)
*H04N 19/105* (2014.01)

(52) U.S. Cl.
CPC ......... *H04N 19/593* (2014.11); *H04N 19/105* (2014.11)

(58) Field of Classification Search
None
See application file for complete search history.

(56) References Cited

U.S. PATENT DOCUMENTS

| 2007/0083578 | A1* | 4/2007 | Chen | H04N 19/593 |
| | | | | 708/203 |
| 2011/0280304 | A1* | 11/2011 | Jeon | H04N 19/105 |
| | | | | 375/240.12 |
| 2014/0185680 | A1* | 7/2014 | Li | H04N 19/597 |
| | | | | 375/240.16 |
| 2015/0049346 | A1 | 2/2015 | Suriawidjaja et al. | |
| 2015/0163512 | A1* | 6/2015 | Cai | H04N 19/593 |
| | | | | 375/240.12 |
| 2015/0350673 | A1* | 12/2015 | Hu | H04N 19/44 |
| | | | | 375/240.12 |

* cited by examiner

*Primary Examiner* — Michael J Hess
(74) *Attorney, Agent, or Firm* — Lewis Roca Rothgerber Christie LLP

(57) ABSTRACT

A method of encoding a video data including a plurality of pictures includes storing data of at least one picture in the video data that is already encoded, and referring to the stored data and using intra-prediction to encode blocks in a current picture.

6 Claims, 12 Drawing Sheets

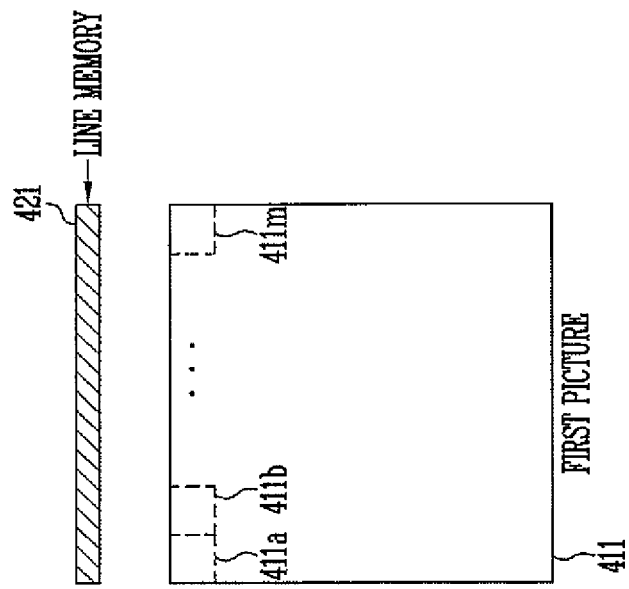
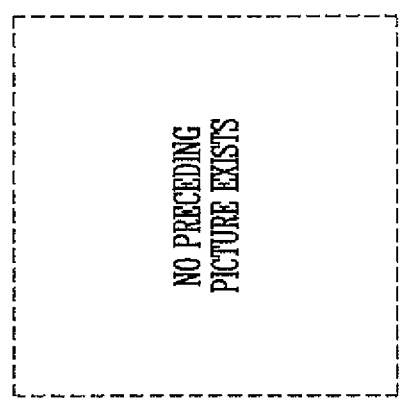
FIG. 5

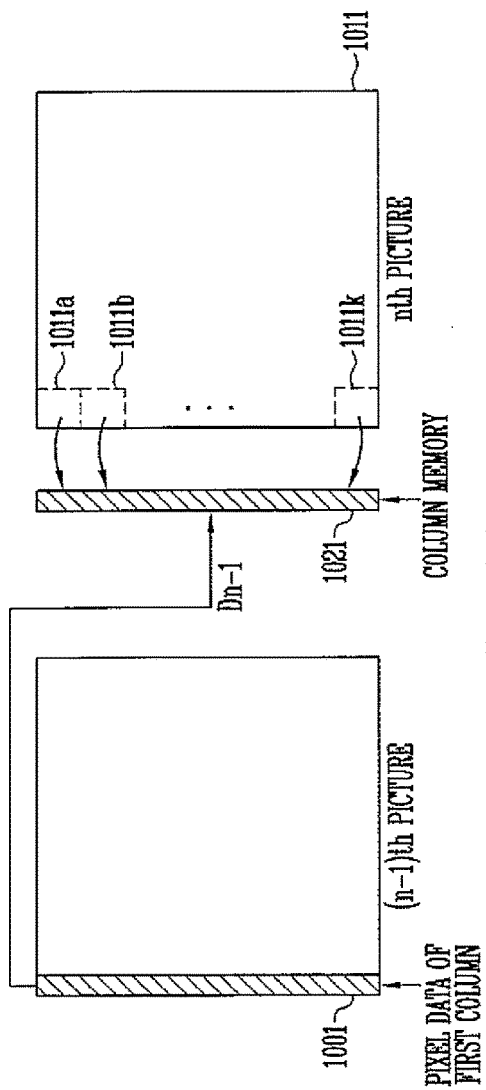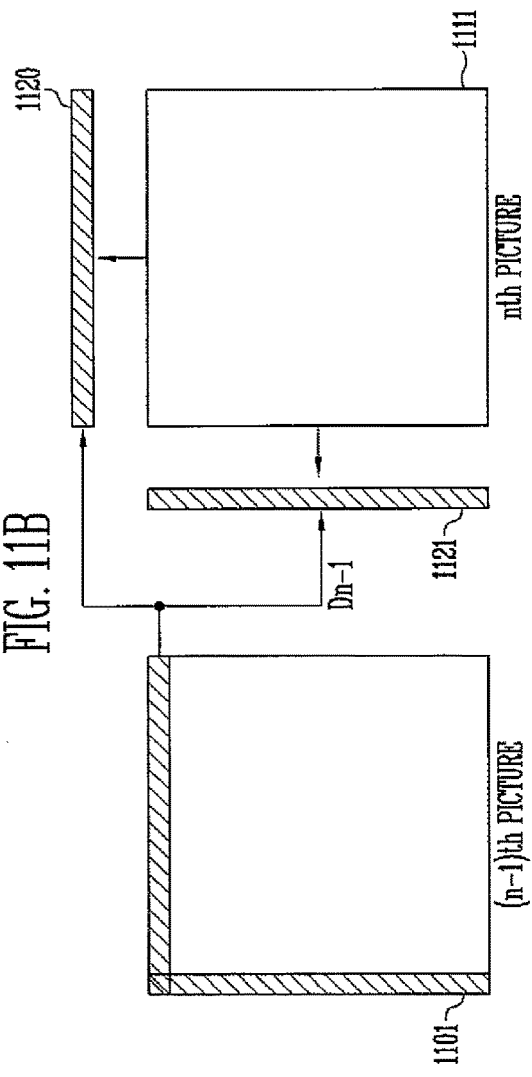

METHOD AND APPARATUS FOR ENCODING AND DECODING IMAGE

CROSS-REFERENCE TO RELATED APPLICATION

This application claims priority to, and the benefit of, Korean Patent Application No. 10-2015-0083703, filed on Jun. 12, 2015, in the Korean Intellectual Property Office, the entire contents of which are incorporated herein by reference in their entirety.

BACKGROUND

1. Field

Embodiments of the present invention relate to video data processing and, more specifically, to a method and an apparatus for encoding and decoding video data.

2. Description of the Related Art

H.264/MPEG-4 Advanced Video Coding (AVC), which is one of compression standards of video data, adopts various technologies for increasing compression efficiency, such as multiple reference motion compensation, loop filtering, variable block size motion compensation, entropy coding, such as CABAC, etc.

According to the H.264 standard draft, one picture is divided into macroblocks to encode video data. Then each of the macroblocks is encoded in all encoding modes available in inter-prediction and intra-prediction, one encoding mode is selected according to a bit rate required for encoding the macroblocks, a distortion degree between original macroblocks and decoded macroblocks is determined, and then the macroblocks are encoded.

Intra-prediction refers to a technology that, rather than refer to a reference picture to encode blocks of a current picture, calculates a prediction value for the current picture to be encoded by using pixel values that are spatially adjacent the current picture to be encoded, and then encodes a difference between the prediction value and an actual pixel value. Here, the intra-prediction mode is largely divided into a 4×4 intra-prediction mode (for luminance components), an 8×8 intra-prediction mode (for a high profile), a 16×16 intra-prediction mode, and an intra-prediction mode for chrominance components.

SUMMARY

An embodiment of the present invention provides an encoding apparatus, and a decoding apparatus, for video data that can improve efficiency of intra-prediction.

Another embodiment of the present invention provides an encoding method, and a decoding method, for video data that can improve efficiency of intra-prediction.

A method of encoding video data including a plurality of pictures according to an embodiment of the present invention includes storing data of least one picture in the video data that is already encoded, and referring to the stored data and using intra-prediction to encode blocks in a current picture.

The storing data may include storing data of a first picture that immediately precedes the current picture.

The storing data of the first picture may include storing first reference data, which is pixel data of a first horizontal line of the first picture, and the referring to the stored data and using intra-prediction to encode blocks in a current picture may include loading the first reference data, and intra-predicting, based on the first reference data, a block including pixels of a first horizontal line of the current picture.

The storing data further may include storing second reference data, which is pixel data of a first vertical line of the first picture, and the referring to the stored data and using intra-prediction to encode blocks in a current picture may include loading the second reference data, and intra-predicting, based on the second reference data, a block including pixels of a first vertical line of the current picture.

The storing data may include calculating an average value of pixel data values of a first horizontal line of a first picture, the first picture immediately preceding the current picture, and storing the calculated average value, and the referring to the stored data and using intra-prediction to encode blocks in a current picture may include loading the calculated average value, and intra-predicting a block including pixels of a first horizontal line of the current picture based on the calculated average value.

The storing data may include dividing a first horizontal line of a first picture, which immediately precedes the current picture, into m sections, wherein m is a natural number greater than one, calculating an average value of pixel data values for each of the m sections, and storing each of the m calculated average values, and the referring to the stored data and using intra-prediction to encode blocks in a current picture may include loading the m calculated average values, and intra-predicting a block including pixels of a first horizontal line of the current picture based on the m calculated average values.

The storing data may include calculating k similarity values by comparing each pixel data of a first horizontal line of each of k previously encoded pictures with pixel data of a first horizontal line of the current picture, wherein k is a natural number greater than one, selecting one of the k previously encoded pictures as corresponding to a biggest similarity value of the k calculated similarity values, and storing pixel data of a first horizontal line of the selected previously encoded picture as third reference data, and the referring to the stored data and using intra-prediction to encode blocks in a current picture may include loading the third reference data, and intra-predicting a block including pixels of the first horizontal line of the current picture based on the third reference data.

The apparatus for encoding video data according to another embodiment of the present invention includes a frame memory for storing data of at least one preceding picture, and an intra-predicting unit for receiving the data of the at least one preceding picture from the frame memory, and for performing intra-prediction encoding on a current picture.

The frame memory may be configured to store data of an immediately preceding picture that immediately precedes the current picture, and may be configured to transfer the stored data to the intra-predicting unit.

The intra-predicting unit may include a line memory configured to store the data of the at least one preceding picture received from the frame memory, and a block prediction encoding unit configured to perform intra-prediction encoding on blocks included in the current picture based on the data stored in the line memory.

The intra-predicting unit may be configured to store an initial value in the line memory, when the current picture is a first picture of the video data, and store pixel data of a first line of an immediately preceding picture that immediately precedes the current picture in the line memory, when the current picture is not the first picture of the video data.

The intra-predicting unit may further include an average calculating unit that is configured to store an initial value in the line memory, when the current picture is a first picture of the video data, and calculate an average value of pixel data of a first line of an immediately preceding picture that immediately precedes the current picture, and store the average value in the line memory, when the current picture is not the first picture of the video data.

The intra-predicting unit may further include an average calculating unit that is configured to store an initial value in the line memory, when the current picture is a first picture of the video data, and divide a first line of an immediately preceding picture that immediately precedes the current picture into m sections (m is a natural number greater than one), calculate an average value of pixel data for each of the m sections, and store the average values in the line memory, when the current picture is not the first picture of the video data.

The intra-predicting unit may further include a comparing unit that is configured to calculate k similarity values by comparing each pixel data of a first horizontal line of k previously encoded pictures (k is a natural number greater than one) with pixel data of the current picture, and store pixel data of the first horizontal line of one of the k previously encoded pictures in the line memory based on the k calculated similarity values.

According to the present invention, prediction efficiency can be improved by referring to pixel data of a preceding picture while intra-predicting pictures in video data.

BRIEF DESCRIPTION OF THE DRAWINGS

Example embodiments will now be described more fully hereinafter with reference to the accompanying drawings, wherein:

FIG. 4 and FIG. 5 are diagrams for illustrating a method for encoding video data according to one embodiment of the present invention;

FIG. 11A and FIG. 11B are diagrams for illustrating a method for encoding video data according to yet another embodiment of the present invention.

DETAILED DESCRIPTION

Figure 1:
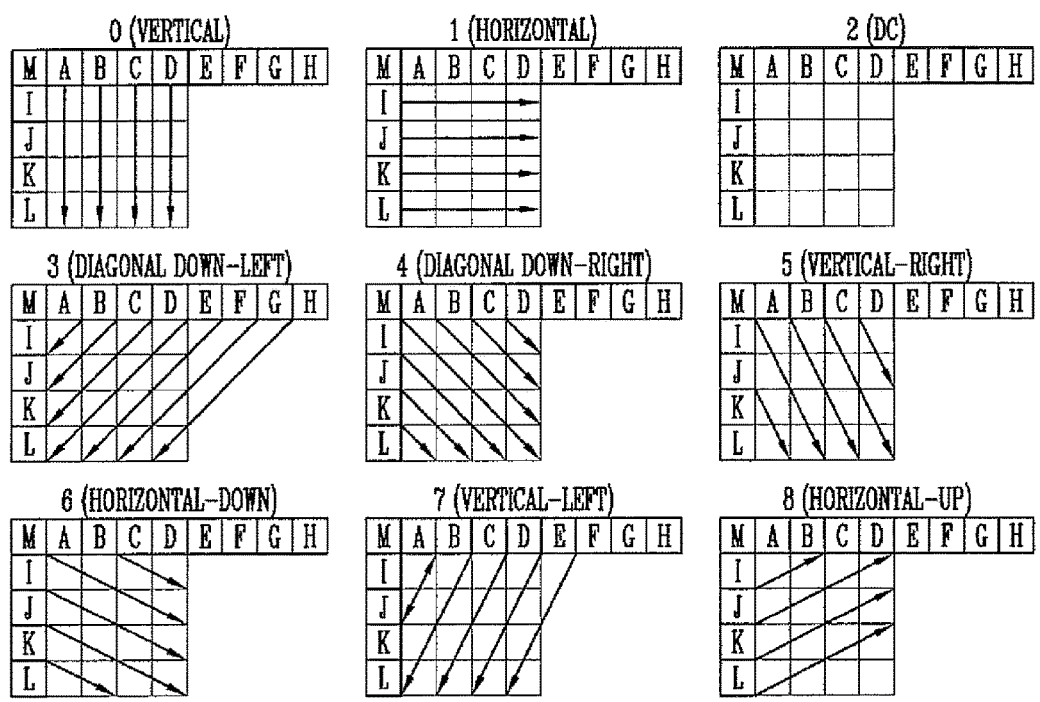
FIG. 1 is a diagram showing a 4×4 intra-prediction mode according to an H.264 standard.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

In this specification, "video data" is used to represent motion picture data including a plurality of pictures or frames, and "picture" is used to represent a single still picture included in the video data. In this specification "picture" and "frame" generally have the same meaning.

FIG. 1 is a diagram showing a 4×4 intra-prediction mode according to an H.264 standard.

Referring to FIG. 1, in the 4×4 intra-prediction mode, there are 9 modes in total: a vertical mode; a horizontal mode; a direct current (DC) mode; a diagonal down-left mode; a diagonal down-right mode; a vertical right mode; a vertical left mode; a horizontal-up mode; and a horizontal-down mode.

As an example, an operation of prediction-encoding a 4×4 sized current block according to a mode 0, which is a vertical mode, is described. At first, pixel values of pixels A to D, which are close to an upper portion of the 4×4 sized current block, are predicted from the pixel values of the current block. That is, the value of pixel A is predicted from four pixel values included in a first column of the current block, the value of pixel B is predicted from four pixel values included in a second column of the current block, the value of pixel C is predicted from four pixel values included in a third column of the current block, and the value of pixel D is predicted from four pixel values included in a fourth column of the current block. Next, difference values are obtained by subtracting values (e.g., predicted values) included in the current block, which are predicted by using the pixels A to D, from actual values of the pixels included in the original current block, and then the difference values are encoded.

As another example, an operation of prediction-encoding a 4×4 sized current block according to a mode 1, which is a horizontal mode, is described. At first, pixel values of pixels I to L, which are close to a left portion/side of the 4×4 sized current block, are predicted from the pixel values of the current block. That is, the value of pixel I is predicted from four pixel values included in a first row of the current block, the value of pixel J is predicted from four pixel values included in a second row of the current block, the value of pixel K is predicted from four pixel values included in a third row of the current block, and the value of pixel L is predicted from four pixel values included in a fourth row of the current block. Next, difference values are obtained by subtracting values (e.g., predicted values) included in the current block, which are predicted by using the pixels I to L, from actual values of the pixels included in the original current block, and then the difference values are encoded.

Here, a block including the pixels A to D, which is a block positioned above/over the current block, can be a block that is already intra-prediction encoded. Meanwhile, a block including pixels E and F, which is a block positioned near a top right portion of the current block, can be either a block that is already intra-prediction encoded, or a block that is yet to be intra-prediction encoded. When the block positioned near the top right portion of the current block (e.g., the block including pixels E and F) is a block that is already intra-prediction encoded, when performing intra-prediction according to mode 3 or mode 7, for example, values for the pixels E and F can be directly referred to. When the block has yet to be intra-prediction encoded, when performing intra-prediction according to mode 3 or mode 7, for example, values for the pixels E and F can be replaced by a value corresponding to the pixel D, and can then be referred to.

In an embodiment of encoding video data according to the H.264 standard, the current macroblock is encoded first according to the 4×4 intra-prediction mode, and the intra-encoding is performed according to the mode with the lowest cost (e.g., resource cost). More specifically, four 16×16 intra-prediction modes are performed on the current macroblock to select a 16×16 intra-prediction mode with the lowest cost, and then nine 4×4 intra-prediction modes are sequentially performed for 4×4 subblocks to select the mode(s) with the lowest cost for the respective subblocks. Then, the cost of the selected 16×16 intra-prediction mode is compared with the cost of the 4×4 intra-prediction modes by adding the costs of the respective subblocks, and then the mode with the lowest cost is finally selected.

Meanwhile, when referring to the respective modes shown in FIG. 1, mode 0, mode 2, mode 3, mode 4, mode 5, mode 6, and mode 7 perform intra-prediction by referring to the pixel data (that is, data of respective ones of pixels A, B, C, D, E, F, G, and H) positioned above the current block. However, when the current block is positioned at an uppermost portion within the picture, because there is no pixel data positioned over the current block, it may be problematic. According to the present invention, because pixel data of a preceding picture, which is already encoded, is referred to while intra-predicting the current picture to be encoded, efficient intra-prediction can be realized.

Figure 2:
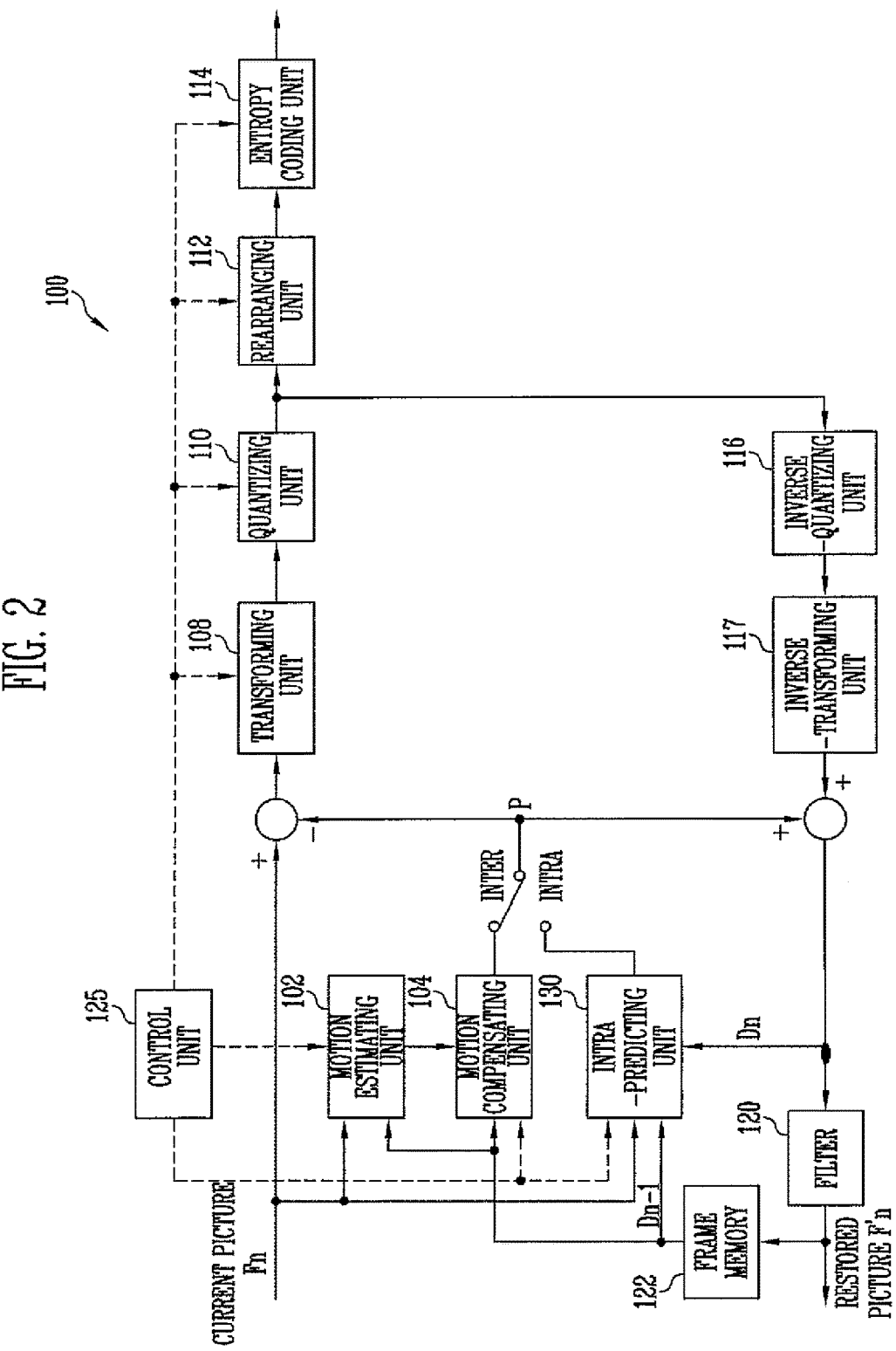
FIG. 2 is a block diagram showing an apparatus for encoding video data according to one embodiment of the present invention.

FIG. 2 is a block diagram showing an apparatus for encoding video data according to one embodiment of the present invention. When referring to FIG. 2, the apparatus 100 for encoding video data includes a motion estimating unit 102, a motion compensating unit 104, an intra-predicting unit 130, a transforming unit 108, a quantizing unit 110, a rearranging unit 112, an entropy coding unit 114, an inverse-quantizing unit 116, an inverse-transforming unit 117, a filter 120, frame memory 122, and a control unit 125.

The operation of searching for a prediction value of a macroblock of the current block for inter-prediction is performed in the motion estimating unit 102.

When the reference blocks are searched for every ½ pixel or ¼ pixel, the motion compensating unit 104 calculates median pixel values thereof to set reference block data values. Similarly, inter-prediction is performed in the motion estimating unit 102 and the motion compensating unit 104.

The intra-predicting unit 130 performs intra-prediction to search for prediction values of the current block in the current picture. The intra-predicting unit 130 according to the present embodiment receives data Dn of the current picture that is to be prediction-encoded, and performs intra-prediction encoding in the intra 4×4 prediction mode or the intra 8×8 prediction mode, and in the intra-chrominance mode, as shown is FIG. 1. During this process, the intra-predicting unit 130 may receive data Dn-1 of at least one picture of previously encoded pictures from the frame memory 122, and may refer to the data Dn-1 during the intra-prediction. The data Dn-1 of the previously encoded picture can be referred to while intra-predicting a block positioned at an uppermost boundary area of the current picture Dn.

As described with reference to FIG. 1, there is no pixel data positioned above/higher than the uppermost block in the picture. Therefore, when intra-predicting the uppermost block, the upper pixel data to be referenced may be arbitrarily assigned. When the arbitrarily assigned upper pixel data is greatly different from the pixel data in the corresponding block, prediction efficiency is decreased. For example, when input data is 8-bit, when a median value of 127 or 128 (between 0 and 28-1, or between 0 and 255) is arbitrarily assigned as the upper pixel data, and when an actual pixel data value in the corresponding block is 10, a prediction error comes to 117 or 118 (i.e., 127 or 128 less 10), which is relatively large. In this case, the prediction efficiency decreased, and overall performance is degraded because the relatively large prediction error adversely affects intra-predictions on other blocks.

By using the apparatus or the method for encoding video data according to embodiments of the present invention, intra-prediction is performed by referring to data of an already encoded picture, which may be an immediately preceding picture that is temporally adjacent to the current picture. Embodiments of the present invention can improve prediction efficiency over the previously described method of arbitrarily assigning the upper pixel data to the block above the current block.

The control unit 125 controls components of the apparatus 100 of encoding video data, and determines a prediction mode for the current block. As an example, the control unit 125 determines a prediction mode that minimizes a difference between the original block and the inter-predicted or intra-predicted block. For example, the control unit 125 calculates costs for the inter-predicted video and the intra-predicted video, and then determines the prediction mode having the smallest cost for the predicted videos as a final prediction mode. Here, calculation of the cost can be performed by various methods. Cost calculation functions to be used may include: a sum of absolute difference (SAD), a sum of absolute transformed difference (SATD), a sum of squared difference (SSD), a mean of absolute difference (MAD), a Lagrange function, etc.

The SAD is obtained by obtaining absolute values of 4×4 block prediction error (residue) values, and by adding up the absolute values. The SATD is a value calculated by obtaining absolute values of coefficients generated by applying a Hadamard transform to predict error values of respective 4×4 blocks, and by adding up the absolute values. The SSD is a value calculated by squaring prediction error values of the respective 4×4 block prediction samples, and by adding up the squaring results. The MAD is a value calculated by obtaining absolute values of the prediction error values of the respective 4×4 block prediction samples. A Lagrangian function is a new function generated by including length information of a bitstream in a cost function.

The prediction data, which is referred to by the macroblocks of the current picture after inter-prediction or intra-prediction, is subtracted from the macroblocks of the current picture, a transformation is performed in the transforming unit 108, and then quantization is performed in the quantizing unit 110. The result of subtracting motion-estimated reference blocks from the macroblocks of the current picture is called a residue. Generally, the residue is encoded to reduce a data amount of encoding of the video data. The quantized residue is delivered to the rearranging unit 112 to be encoded in the entropy coding unit 114.

Meanwhile, the picture, which is quantized to obtain a reference picture to be used in inter-prediction, passes through the inverse-quantizing unit 116 and through the inverse-transforming unit 117, and the current picture is restored. The restored current picture passes through the filter 120, which performs a deblocking filtering, and is stored in the frame memory 122, and then the result is used for performing inter-prediction on the next picture. As described above, the apparatus 100 for encoding video data according to the present embodiment can provide the data Dn-1 of the preceding picture stored in the frame memory 122 to the intra-predicting unit 130, which may then perform intra-prediction by referring to the data Dn-1 of the preceding picture, thereby improving prediction efficiency.

In the present embodiment, the data Dn-1 of the preceding picture, which may be referred to for intra-prediction for blocks of the current picture, can be determined in various ways. In one embodiment, the data Dn-1 can be the data included in the first horizontal line of an immediately preceding picture, which is temporally adjacent the current picture. Based on properties of videos, the data Dn (i.e., data Dn of the pixels included in blocks that are positioned at an uppermost portion of the current picture) is stochastically highly estimated to be similar to the data of the pixels included in the first horizontal line of the immediately preceding picture (e.g., data Dn-1). Therefore, when the data of the pixels included in the first horizontal line of the picture that immediately precedes the current picture is referred to as the data Dn-1 during the intra-prediction, it is stochastically expected that the prediction errors for the pixel data, which is included in the uppermost blocks of the current picture to be currently encoded, will be small. Thus, prediction efficiency can be improved.

Figure 3:
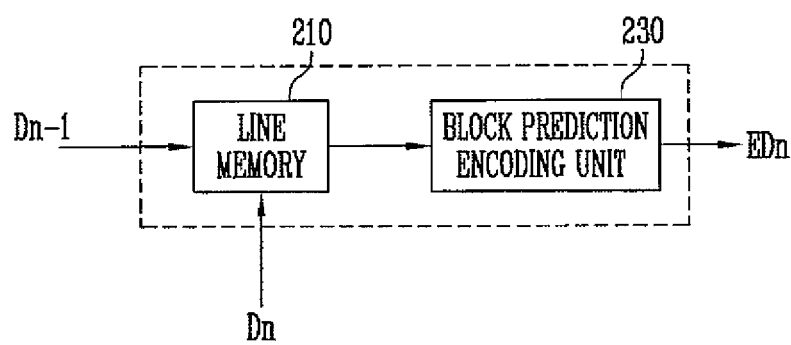
FIG. 3 is a block diagram showing an example of an intra-predicting unit in FIG. 2.

FIG. 3 is a block diagram showing an example of the intra-predicting unit in FIG. 2.

By referring to FIG. 3, the intra-predicting unit 200 included in the apparatus 100 for encoding a video data according to an embodiment of the present invention includes a line memory 210 and a block prediction encoding unit 230. The line memory 210 can store the pixel data Dn of the current picture or the pixel data Dn-1 of the preceding picture.

When the current picture is the first picture in the video data, there exists no pixel data of a preceding picture, and the line memory 210, therefore, cannot store the pixel data of the preceding picture. In this case, when intra-predicting the blocks in the current picture, it is possible that pixel data of a preceding picture is not referred to. Blocks positioned at an uppermost position in the picture can be predicted to have, for example, reference values for prediction according to Mode 0. In one embodiment, the reference values can be determined to be median values in a data range of the pixels.

For example, when an 8-bit data size is allocated to the respective pixels, the data range is 0 to $2^8-1$, or 0 to 255, and the data can have 256 values. Thus, the median value of 127 or 128 can be determined as the reference value, and the determined 127 or 128 can be assigned as the prediction value in the uppermost block.

When the current picture is not the first picture in the video data, the pixel data Dn-1 of the preceding picture can be stored. Also, the block prediction encoding unit 230 can perform intra-prediction encoding for the respective blocks in the current picture by referring to the pixel data Dn of the current picture or by referring to the pixel data Dn-1 of the preceding picture stored in the line memory 210. Especially, when intra-prediction encoding the uppermost block of the current picture, the block prediction encoding unit 230 can refer to the pixel data Dn-1 of the preceding picture. When block prediction encoding unit 230 performs intra-prediction encoding on blocks that are not positioned on the uppermost unit of the current picture, then the block prediction encoding unit 230 can refer to the pixel data Dn of the current picture.

Figure 4:
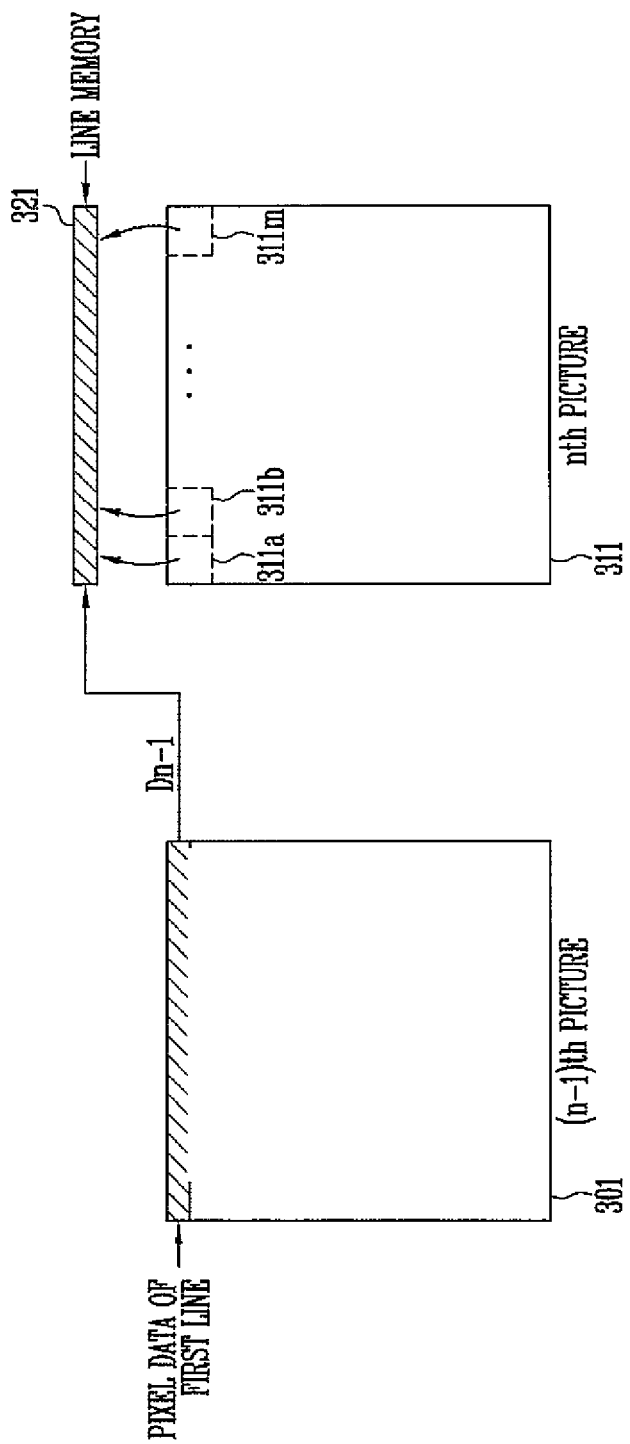

The method for encoding video data according to an embodiment of the present invention is described in detail while referring to FIG. 4 and FIG. 5, which are diagrams for illustrating a method for encoding a video data according to one embodiment of the present invention.

When referring to FIG. 4, there is shown a diagram for illustrating the intra prediction when the current picture (i.e., the $n^{th}$ picture 311) is not the first picture in the video data (i.e., there is a preceding $(n-1)^{th}$ picture 301). Here, n is a natural number greater than one. By the method of encoding a video data according to one embodiment of the present invention, when the current picture 311 is not the first picture in the video data, the intra-prediction encoding on the blocks of the current picture 311 can be performed by referring to the data of the $(n-1)^{th}$ picture 301, which immediately temporally precedes the current picture 311. The pixel data of the first horizontal line of the $(n-1)^{th}$ picture 301 is stored in the line memory 321 as first reference data Dn-1, and when encoding blocks 311a, 311b, . . . , 311m, which are positioned at the uppermost portion of the $n^{th}$ picture 311, the first reference data Dn-1 stored in the line memory 321 is loaded, and then the blocks 311a, 311b, . . . , 311m including the pixels of the first horizontal line of the $n^{th}$ picture 311 can be intra-predicted by referring to the loaded first reference data Dn-1.

The $n^{th}$ picture and the $(n-1)^{th}$ picture are temporally adjacent pictures in the video data. Therefore, the pixel data of the first horizontal line of the $(n-1)^{th}$ picture is can stochastically have values that are similar to values of the data of the pixels included in the blocks 311a, 311b, . . . , 311m positioned at the uppermost portion of the $n^{th}$ picture. Accordingly, the prediction error can be decreased, and encoding performance can be improved, due to the pixel data of the first horizontal line of the $(n-1)^{th}$ picture 301 being used in encoding the blocks 311a, 311b, . . . , 311m positioned at the uppermost portion of the $n^{th}$ picture 311 as the first reference data Dn-1.

In the embodiment in FIG. 4, a size of the line memory 321 can be determined according to a pixel number in a horizontal direction of the picture in the video data. For example, when the number of horizontal direction pixels in the video data in HDTV is 1920, and when the data value of a single pixel is Du, then the line memory 321 may have a data storage capacity of at least 1920×Du. In the meantime, the overall 1920 pixel data included in the first line of the $(n-1)^{th}$ picture can be losslessly stored in the line memory 321, and the overall pixel data included in the first line of the $(n-1)^{th}$ picture can be referred to in encoding the blocks 311a, 311b, . . . , 311m positioned at the uppermost portion of the $n^{th}$/current picture.

When encoding of the blocks 311a, 311b, . . . , 311m positioned at the uppermost portion of the $n^{th}$ picture is completed, the pixel data of the $(n-1)^{th}$ picture might no longer be referred to, because the pixel data included in the blocks that are higher than the corresponding block in the current picture may be referred to.

As shown in FIG. 4, when referring to the pixel data of the preceding picture in intra-predicting the blocks included in the current picture, because the pixel data of the first line of the $(n-1)^{th}$ picture can possibly have values that are similar to those of the data of the pixels included in the blocks 311a, 311b, . . . , 311m of the $n^{th}$ picture, the prediction efficiency is improved when compared to performing intra-prediction encoding by referring to an arbitrary value, thereby improving performance of an apparatus for encoding a video data.

When referring to FIG. 5, there is shown a diagram for illustrating the intra prediction when the current picture 411 is the first picture in the video data. It is different from FIG. 4, in that there exists no preceding picture when a target picture to be intra-prediction encoded is the first picture in a video data. Thus, in this case, the line memory 421 cannot store the pixel data of the preceding picture, although the line memory 421 can store an arbitrarily determined value as the reference data. As described above, when the current picture 411 is the first picture in the video data, the reference data can be determined as a median value of a data range of the pixels. For example, when an 8-bit data size is allocated to the respective pixels, the data range is 0 to 28-1, or 0 to 255, and they can have 256 values. Thus, the median value of 127 or 128 can be determined as the reference value, and it can be stored in the line memory 421. Then, while encoding the blocks 411a, 411b, . . . , 411m positioned at the uppermost portion of the current picture 411, the data of 127 or 128 stored in the line memory 421 can be referred to perform intra-prediction.

Figure 6:
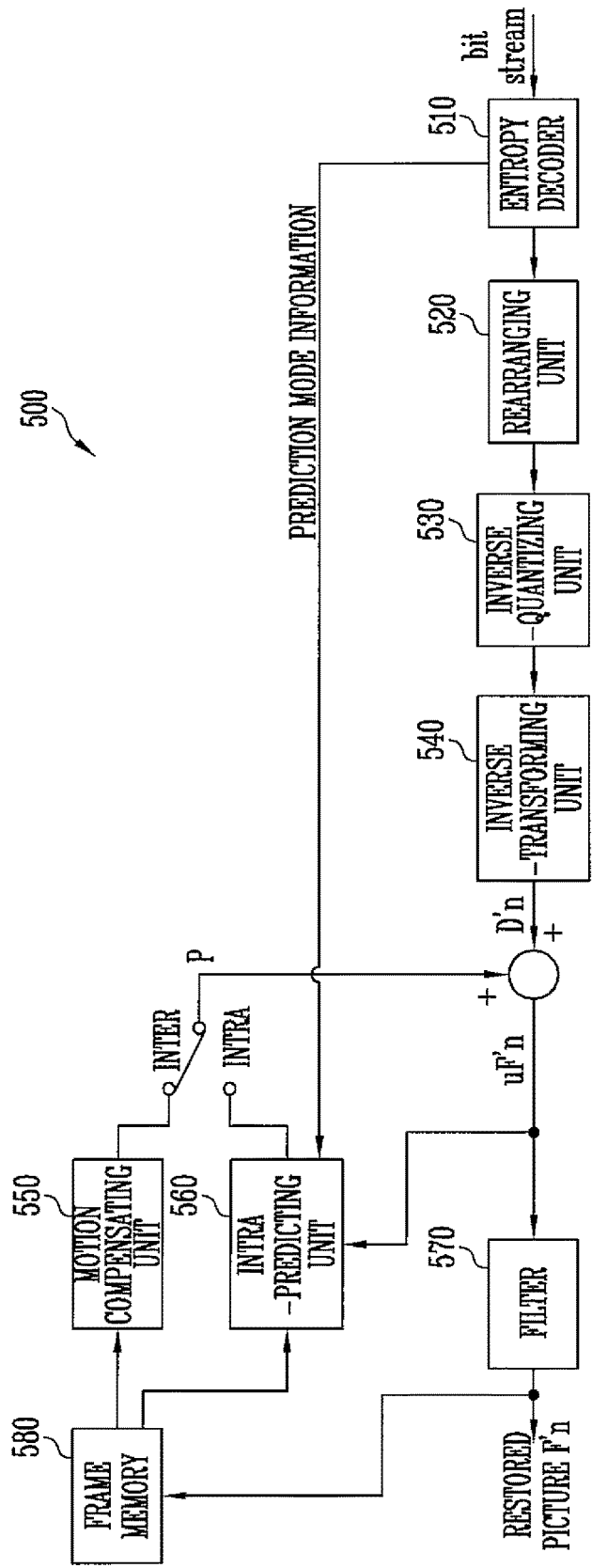
FIG. 6 is a block diagram showing an apparatus for decoding video data according to one embodiment of the present invention.

FIG. 6 is a block diagram showing an apparatus for decoding video data according to one embodiment of the present invention. When referring to FIG. 6, the apparatus 500 for decoding a video data includes an entropy decoder 510, a rearranging unit 520, an inverse-quantizing unit 530, an inverse-transforming unit 540, a motion compensating unit 550, an intra-predicting unit 560, and a filter 570. Here, the intra-predicting unit 560 can correspond to the intra-predicting unit 130 shown in FIG. 2 and FIG. 3.

The entropy decoder 510 and the rearranging unit 520 receive compressed bitstreams, and perform entropy decoding to generate a quantized coefficient X. The inverse-quantizing unit 530 and the inverse-transforming unit 540 perform inverse-quantization and inverse-transformation on the quantized coefficient X to extract transform encoding coefficients, motion vector information, header information, intra-prediction mode information, etc. The motion compensating unit 550 and the intra-predicting unit 560 generate prediction blocks P according to types of encoded pictures by using the decoded header information, and the prediction block P is added to D'n, which represents error values, to generate uF'n. The uF'n passes through the filter 570 to generate a restored picture F'n.

The intra-predicting unit 560 included in the apparatus 500 for decoding a video data according to the present embodiment can determine the intra-prediction mode used for encoding the block, which is currently decoded by using the intra-prediction mode information included in the received bitstream. Meanwhile, the intra-predicting unit 560 receives the data of the preceding picture from the frame memory 580, and may perform intra-prediction on the blocks included in the current picture.

Figure 7:
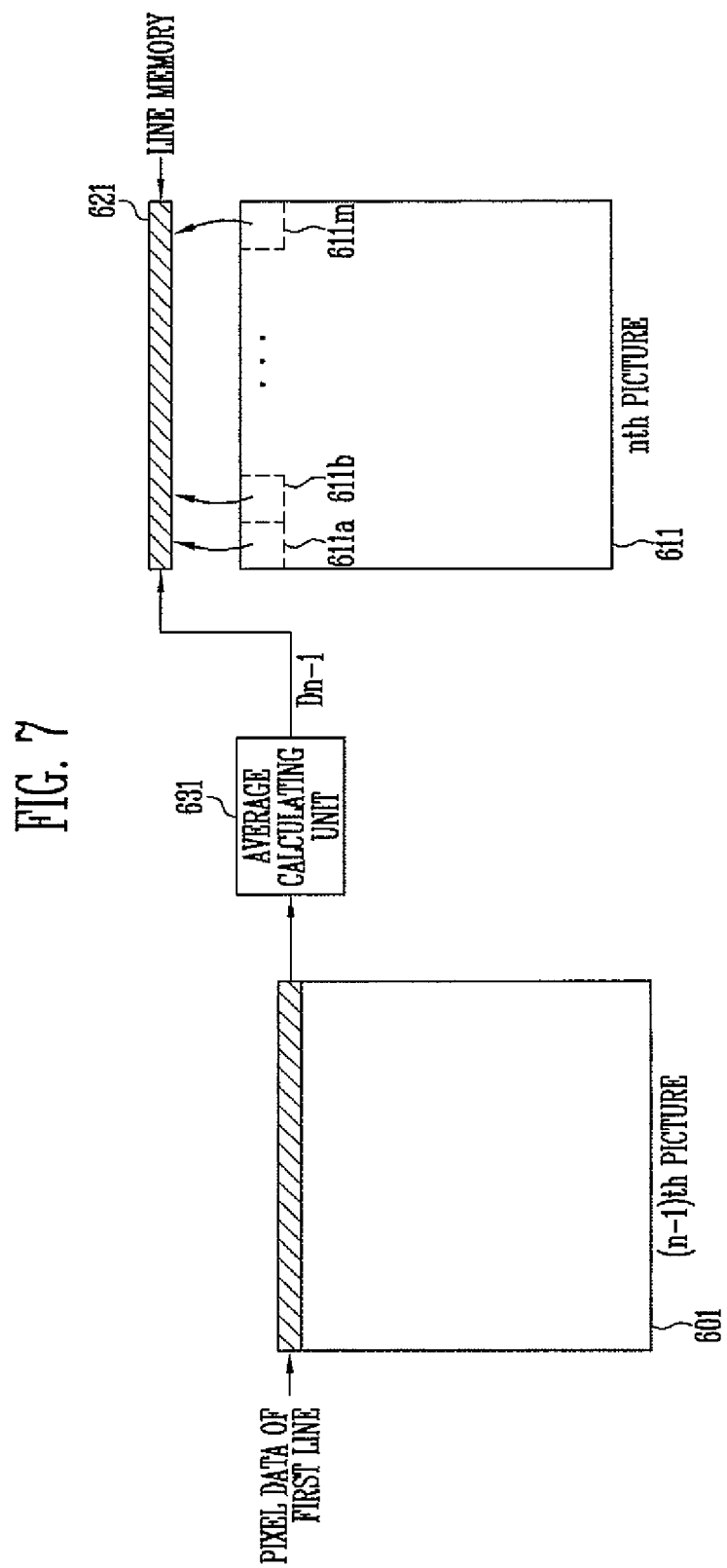
FIG. 7 is a diagram for illustrating a method for encoding video data according to another embodiment of the present invention.

FIG. 7 is a diagram for illustrating a method for encoding a video data according to another embodiment of the present invention.

When referring to FIG. 7, the pixel data of the first horizontal line of the $(n-1)^{th}$ picture 601 is delivered to an average calculating unit 631, which can be included in the intra-predicting unit 130 in FIG. 2. The average calculating unit 631 calculates an average value of the pixel data of the first line of the $(n-1)^{th}$ picture 601, and may provide the result to the line memory 621 as first reference data Dn-1. Then, when encoding the blocks 611a, 611b, . . . , 611m, which are positioned at the uppermost portion of the current/$n^{th}$ picture 611, the first reference data Dn-1 stored in the line memory 621 is loaded, and the blocks 611a, 611b, . . . , 611m corresponding to the pixels of the first horizontal line of the $n^{th}$ picture 611 can be intra-predicted by referring to the loaded first reference data Dn-1.

The present embodiment differs from the embodiment shown in FIG. 4 in that a single data value is stored in the line memory 621 as the first reference data Dn-1. For example, when the number of horizontal direction pixels in the video data in HDTV is 1920, and when the data value of a single pixel is Du, the line memory 321 according to the embodiment shown in FIG. 4 may have a data storage capacity of at least 1920×Du, and the overall 1920 pixel data included in the first line of the $(n-1)^{th}$ picture can be losslessly stored in the line memory 321. Contrastingly, because the line memory 621 according to the present embodiment of FIG. 7 is provided with the average value Dn-1 received from the average calculating unit 631 as the first reference data Dn-1, the line memory 621 can have the data storage capacity of Du. Although the embodiment of FIG. 7 may have larger prediction error, when compared with the embodiment of FIG. 4, the present embodiment is able to load only one first reference data Dn-1, which is an average value, rather than load 1920 pixel data.

Figure 8:
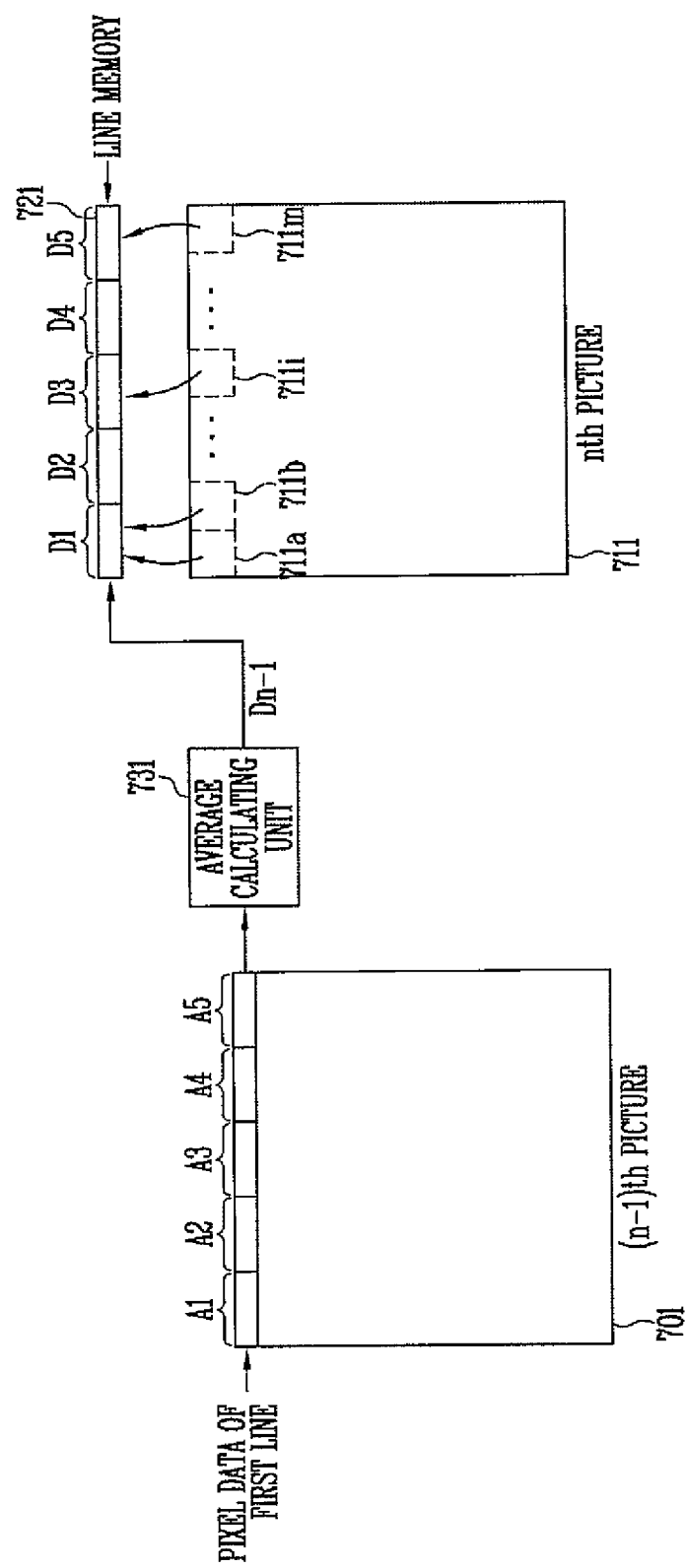
FIG. 8 is a diagram for illustrating a method for encoding video data according to yet another embodiment of the present invention.

FIG. 8 is a diagram for illustrating a method for encoding a video data according to yet another embodiment of the present invention.

When referring to FIG. 8, the pixel data of the first line of the $(n-1)^{th}$ picture 701 is delivered to an average calculating unit 731, which can be included in the intra-predicting unit 130 in FIG. 2. The average calculating unit 731 can divide the first line of $(n-1)^{th}$ picture 701 into m (m is a natural number greater than one) sections. In this case, m can be selected in various ways according to embodiments. In FIG. 8, m is determined to be 5, and the first line of the $(n-1)^{th}$ picture 701 is divided into five sections A1, A2, A3, A4, and A5.

Meanwhile, the average calculating unit 731 can calculate averages of pixel data corresponding to the five sections A1, A2, A3, A4, and A5 for each respective section. That is, the average calculating unit 731 calculates an average of the pixel data included in the section A1, and can calculate respective averages of the pixel data included in the respective remaining sections A2, A3, A4, and A5. Thus, the average calculating unit 731 in the embodiment of FIG. 8 can calculate 5 different average values to be stored in the line memory 721 as the first reference data Dn-1. When referring to the line memory 721 of FIG. 5, the average value corresponding to the section A1 is stored in an address space D1, and the average value corresponding to the section A2 can be stored in an address space D2. Similarly, the average values corresponding to the sections A3 to A5 can respectively be stored in address spaces D3 to D5.

Then, when encoding the blocks 711a, 711b, . . . , 711m which are positioned at the uppermost portion of the $n^{th}$ picture 711, the first reference data Dn-1 stored in the line memory 721 is loaded, and then the blocks 711a, 711b, . . . , 711m positioned at the uppermost portion of the $n^{th}$ picture 711 can be intra-predicted by referring to the loaded first reference data Dn-1. For example, when the number pixels in the horizontal direction in the picture in the video data is 1920 in HDTV, there can be 480 4×4 sized blocks in one line. That is, in the embodiment of FIG. 8, the number of blocks 711a, 711b, . . . , 711m positioned at the uppermost portion of the $n^{th}$ picture 711 is a total of 480 blocks. Because the first line of the $(n-1)^{th}$ picture 701 is divided into five sections A1, A2, A3, A4, and A5 in total, 96 blocks (i.e., 480 total blocks divided by 5 sections) can refer to the same average value. In other words, the average value stored in the address space D1 of the line memory 721 is referred to while intra-prediction encoding the first 96 blocks of the blocks 711a, 711b, . . . , 711m, and the average value stored in the address space D2 of the line memory 721 can be referred to while intra-prediction encoding the next 96 blocks of the blocks 711a, 711b, . . . , 711m.

The present embodiment differs from the embodiments shown in FIG. 4 and FIG. 7 in that m average values are stored in the line memory 721 as first reference data Dn-1. For example, when the number of horizontal direction pixels in the video data in HDTV is 1920, and when the data value of a single pixel is Du, the line memory 321 according to the embodiment shown in FIG. 4 can at least have a data storage capacity of 1920×Du, and all of the 1920 pixel data included in the first line of the $(n-1)^{th}$ picture can be stored losslessly in the line memory 321. Meanwhile, because the line memory 621 according to the embodiment of FIG. 7 is provided with the average value Dn-1 from the average calculating unit as the first reference data Dn-1, the line memory 621 can have the data storage capacity of Du. Contrastingly, because the line memory 721 of the present embodiment of FIG. 8 is provided with m average values as the first reference data Dn-1, the line memory 721 can have the data storage capacity of m×Du. Therefore, according to the present embodiment of FIG. 8, the prediction error is greater than the embodiment of FIG. 4, but is smaller than the embodiment of FIG. 7. Also, although the embodiment of the FIG. 4 should load 1920 pixel data, the present embodiment of FIG. 8 should load only m average values.

The number m of the divided sections of the first line of the $(n-1)^{th}$ picture 701 can be selected in various ways, and the performance of the present embodiment comes to be similar to that of the embodiment of FIG. 4 as m increases, but comes to be similar to that of the embodiment of FIG. 7 as m decreases.

Figure 9:
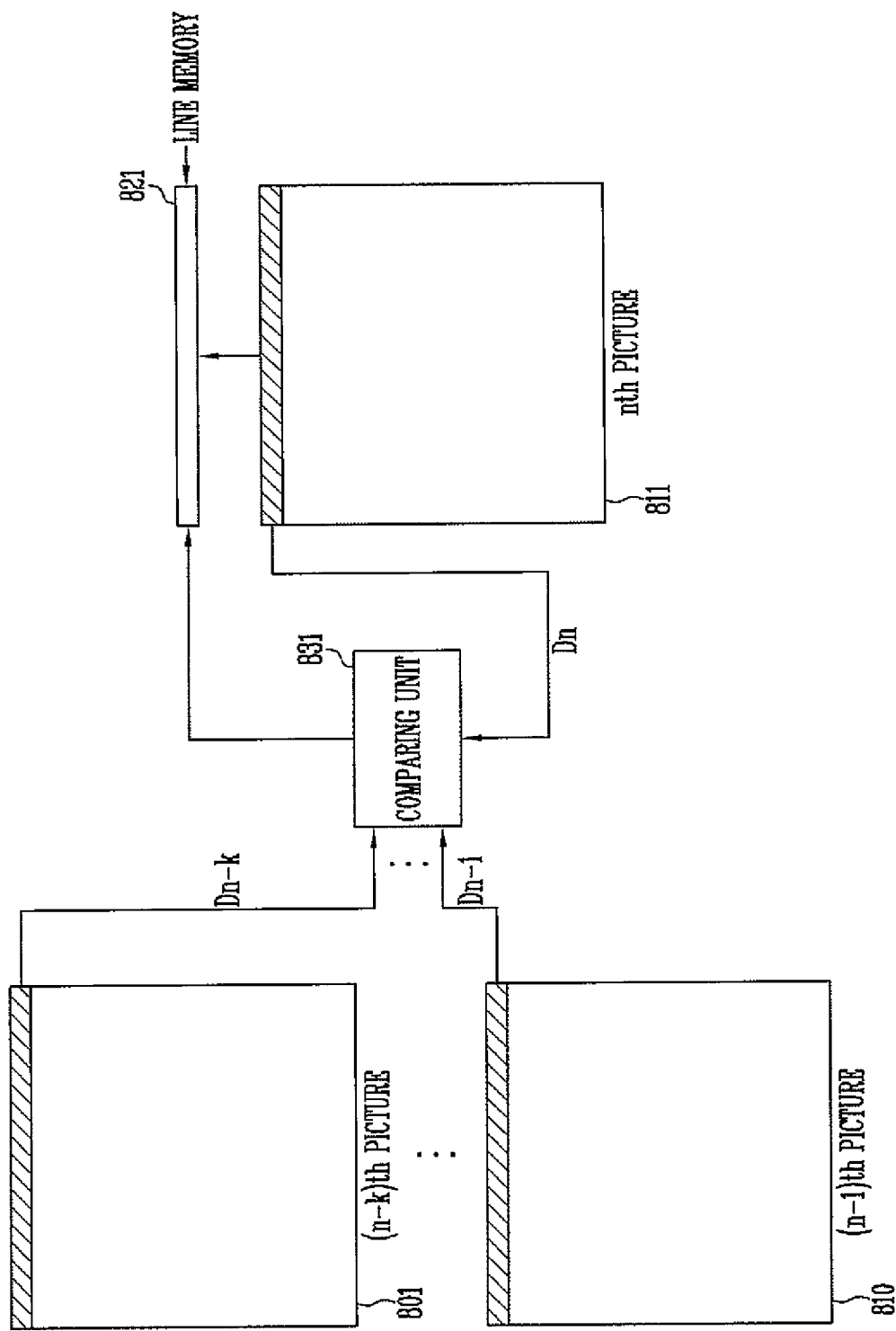
FIG. 9 is a diagram for illustrating a method for encoding video data according to yet another embodiment of the present invention.

FIG. 9 is a diagram for illustrating a method for encoding a video data according to yet another embodiment of the present invention.

When referring to FIG. 9, while encoding the current/$n^{th}$ picture 811 to be encoded, pixel data of pixel data Dn-k, Dn-k+1, . . . , Dn-1 of k first horizontal lines (k is a natural number greater than one) of pictures 801, . . . , 810, which are already encoded, are delivered to a comparing unit 831. Also, the pixel data Dn of the first horizontal line of the current picture 811 is delivered to the comparing unit 831. The comparing unit 831 compares each of the pixel data Dn-k, Dn-k+1, . . . , Dn-1 with the pixel data Dn to calculate similarity values. The similarity values can be calculated by accumulating the similarities between values of respective pixels at corresponding horizontal positions. For example, when the number pixels in the horizontal direction in the picture in the video data is 1920 in HDTV, then 1920 pixel data values can be included in the first horizontal lines of the current picture 811 and the $(n-1)^{th}$ picture 810, respectively. When the 1920 pixel data values included in the pixel data Dn-1 of the first horizontal line of the $(n-1)^{th}$ picture 810 are the same as the 1920 data values included in the current picture 811, the similarity can be calculated to be 1. When the 1920 pixel data values included in the pixel data Dn-1 of the first horizontal line of the $(n-1)^{th}$ picture 810 are different from each of the respective 1920 data values included in the current picture 811, the similarity can be calculated to be 0. When the 50% of the 1920 pixel data values included in the pixel data Dn-1 of the first horizontal line of the $(n-1)^{th}$ picture 810 are the same as the 1920 data values included in the current picture 811, the similarity can be calculated to be 0.5.

Similarly, the comparing unit 831 can compare each of the pixel data Dn-k, Dn-k+1, . . . , Dn-1 with the pixel data Dn to calculate k similarity values. Also, the comparing unit 831 can select the picture corresponding to the biggest value of the k similarity values, and can store the pixel data corresponding to the selected picture in the line memory 821. For example, when the value corresponding to the $(n-3)^{th}$ picture is biggest when compared with the values for other pictures, then the comparing unit 831 can select the $(n-3)^{th}$ picture and store the pixel data Dn-3 corresponding to the $(n-3)^{th}$ picture in the line memory 821. Then, when encoding the blocks positioned at the uppermost portion of the current picture 811, intra-prediction can be performed by referring to the pixel data Dn-3 stored in the line memory 821.

The embodiment of FIG. 9 is an extended version of the embodiment of FIG. 4, and has more preceding pictures depicted. Although only the pixel data of the $(n-1)^{th}$ picture can be referred to while intra-predicting the current picture in the embodiment of FIG. 4, the embodiment of FIG. 9 selects a picture having the most similar data values as the current picture from k different pictures preceding the current picture, and refers to the selected picture during the intra-prediction of the current picture, thereby decreasing a prediction error.

Figure 10:
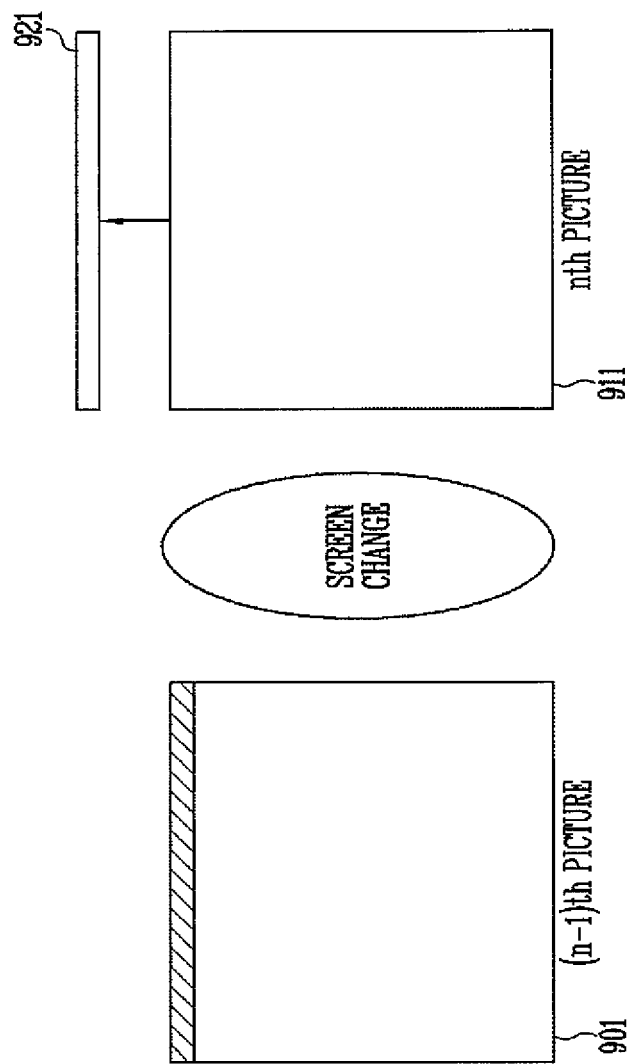
FIG. 10 is a diagram for illustrating a method for encoding video data according to yet another embodiment of the present invention.

FIG. 10 is a diagram for illustrating a method for encoding a video data according to yet another embodiment of the present invention.

When referring to FIG. 10, a case in which a screen change occurs between an $(n-1)^{th}$ picture 901 and an $n^{th}$ picture 911 is shown. When there is a screen change between the $(n-1)^{th}$ picture 901 and the $n^{th}$ picture 911, the correlation degree between pixel data in both pictures 901, 911 can be significantly low. Therefore, in the case as above, the pixel data of $(n-1)^{th}$ picture 901 can be stored in the line memory 921 such that the prediction error is not low even when intra-predicting the blocks in $n^{th}$ picture 911. Therefore, the calculation amount can be reduced by preventing the pixel data of preceding $(n-1)^{th}$ picture from being referenced. When there is a screen change, a flag, which prevents reference to the pixel data of the preceding $(n-1)^{th}$ picture, can be included in video compression information, such that unnecessary reference processes can be omitted. In this case, similar to the aforementioned description referring to FIG. 5, intra-prediction encoding can be performed by regarding the current picture 911 as the first picture in the video data.

FIG. 11A and FIG. 11B are diagrams for illustrating a method for encoding a video data according to yet another embodiment of the present invention.

When referring to FIG. 11A, when the current/$n^{th}$ picture 1011 is not the first picture in the video data, the intra-prediction encoding on the blocks of the current picture 1011 can be performed by referring to the data of the immediately temporally preceding $(n-1)^{th}$ picture 1001. The pixel data of the first vertical line of the $(n-1)^{th}$ picture 1001 is stored in the column memory 1021 as second reference data Dn-1, and when encoding the blocks 1011a, 1011b, . . . , 1011k of the current/$n^{th}$ picture 1011, which are positioned in a first vertical line at the leftmost portion of the $n^{th}$ picture 1011, the second reference data Dn-1 stored in the column memory 1021 is loaded, and then the blocks 1011a, 1011b, . . . , 1011k can be intra-predicted by referring to the loaded second reference data Dn-1.

The difference between the embodiments of FIG. 11A and FIG. 4 is as follows. While the data of the first horizontal line of the $(n-1)^{th}$ picture is referred to during the intra-prediction of the $n^{th}$ picture in the embodiment of FIG. 4, the data of the first vertical line of the $(n-1)^{th}$ picture is referred to for the embodiment of FIG. 11A. Therefore, mode 0, mode 2, mode 3, mode 4, mode 5, mode 6, and mode 7 shown in FIG. 1 perform the intra-prediction by referring to the pixel data (that is, pixels A, B, C, D, E, F, G, and H) positioned above the current block. Therefore, the embodiment of FIG. 4 can be used during the intra-prediction according to mode 0, mode 2, mode 3, mode 4, mode 5, mode 6, and mode 7. Meanwhile, mode 1, mode 2, mode 4, mode 5, mode 6, and mode 8 shown in FIG. 1 perform the intra-prediction by referring to the pixel data positioned left of the current block (i.e., pixels I, J, K, and L). Therefore, the embodiment of FIG. 11A can be used during the intra-prediction according to mode 1, mode 2, mode 4, mode 5, mode 6, and mode 8. Although not shown, the column memory 1021 in FIG. 11A can be included in the intra-predicting unit 130 in FIG. 2.

When referring to FIG. 11B, when the current/$n^{th}$ picture 1111 is not the first picture in the video data, the intra-prediction encoding on the blocks of the current picture 1111 can be performed by referring to the data of the immediately temporally preceding/$(n-1)^{th}$ picture 1101. The pixel data of the first horizontal line and the pixel data of the first vertical line of the $(n-1)^{th}$ picture 1001 can be stored in the line memory 1120 and the column memory 1121 as the third reference data Dn-1. Then, while encoding the blocks positioned at the uppermost portion of the $n^{th}$ picture 1111, and while encoding the blocks position at the leftmost portion of the $n^{th}$ picture 1111, the third reference data Dn-1 stored in the line memory 1120 and in the column memory 1121 is loaded, and the blocks, which are positioned at the left and upper boundaries of the $n^{th}$ picture 1111, can be intra-predicted based on the loaded third reference data Dn-1. Therefore, in the embodiment shown in FIG. 11B, because the pixel data of the first horizontal line and the first vertical line of the $(n-1)^{th}$ picture 1101 are referred to during the intra-prediction according to mode 0 to mode 8, the prediction error can be further reduced.

Figure 12:
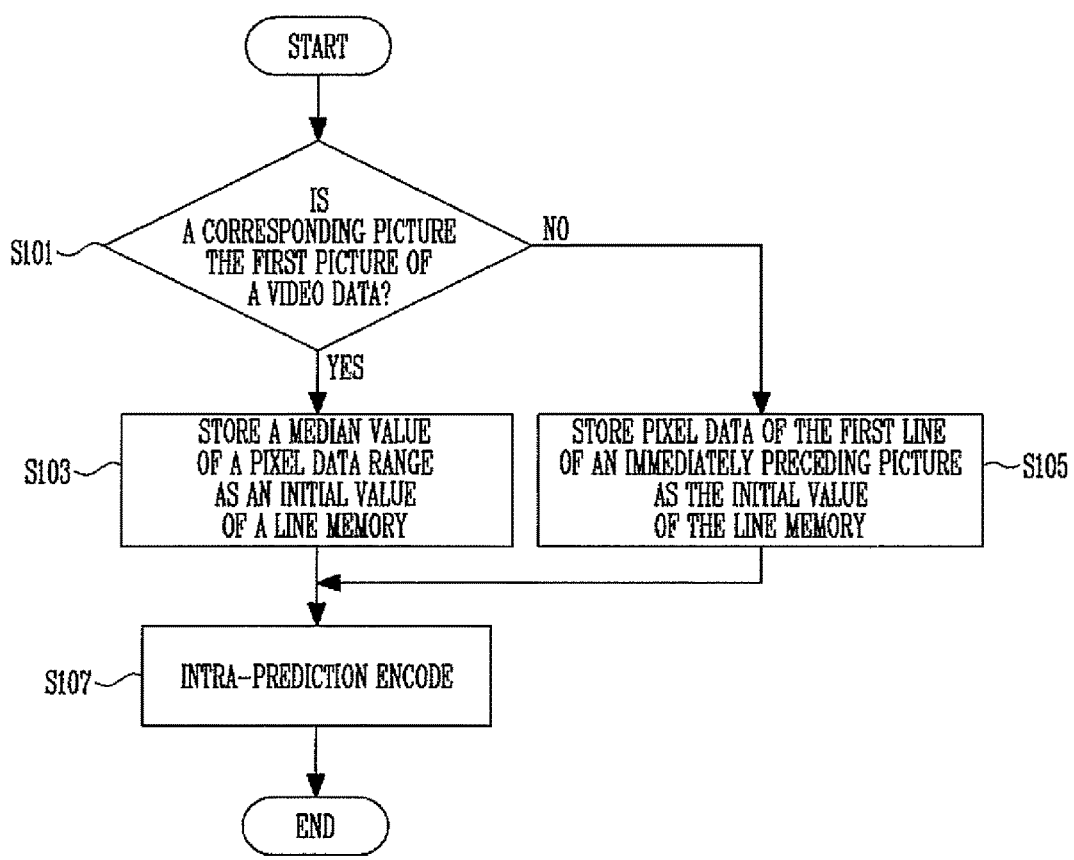
FIG. 12 is a flowchart showing a method for encoding video data according to one embodiment of the present invention.

FIG. 12 is a flowchart showing a method for encoding a video data according to one embodiment of the present invention.

When referring to FIG. 12, according to the method of encoding a video data according to an embodiment of the present invention, it is determined whether a corresponding picture is the first picture of the video data (S101), and, when the corresponding picture is determined to be the first picture of the video data, a median value of a pixel data range is stored as an initial value of the line memory (S103). When the corresponding picture is determined to not be the first picture of the video data, the pixel data of the first line of the preceding picture that temporally adjacent to the current picture is stored as the initial value of the line memory (S105). Then, the blocks of the current picture are intra-prediction encoded based on the values stored in the line memory (S107).

In the meantime, it can be understood that the respective blocks of a process flowchart diagrams and the combinations of the flowchart diagrams can be performed by computer program instructions. Because these computer program instructions can be installed on a processor of an application specific computer or other programmable data processing equipment, the instructions performed by the processor of the computer or other programmable data processing equipment generate means for performing the functions described in the flowchart block(s). Because it is also possible that these computer program instructions can use a computer for implementing functions in a specific way or a computer directed to other programmable data processing equipment or be stored in a computer-readable memory, the instructions which use the computer or are stored in the computer-readable memory can produce manufacture articles embedding an instruction means for performing functions described in the flowchart block(s). Because it is also possible for the computer program instructions to be installed on the computer or other programmable data processing equipment, the instructions which operate the computer or other programmable data processing equipment by generating a process performed by the computer by performing a series of operation steps on the computer or other programmable data processing equipment can also provide steps for executing the functions described in the flowchart block(s).

Also, the respective blocks can represent a unit of a module, a segment, or a code including at least one executable instructions for executing specified logical function(s). Also, in some alternative execution examples, it should be noted that the functions noted in the blocks can occur in different orders. For example, two blocks which are shown to be adjacent to each other can be performed substantially at the same time, or these blocks can sometimes be performed in a reverse order according to corresponding functions.

Additionally, a term "~unit" used herein represents software or hardware such as an FPGA or an ASIC, and the term "~unit" performs some roles. However, the "~unit" does not have a meaning limited to software or hardware. The "~unit" can be configured to reside on an addressable storage medium, and can be configured to execute one or more processors. Therefore, as an example, the "~unit" includes elements such as software elements, object-oriented software elements, class elements, and task elements as well as processes, functions, attributes, procedures, subroutines, segments of program codes, drivers, firmware, microcodes, circuit, data, databases, data structures, tables, arrays, and variables. The functions provided in elements and "~units" can be combined into the smaller number of elements and "~units" or divided into the larger number of elements and "~units." Also, the elements and "~units" can be implemented to execute one or more CPUs in a device or a security multimedia card.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims and their equivalents.

What is claimed is:

1. A method of encoding video data comprising a plurality of pictures, the method comprising:
    storing data of at least one first picture in the video data that is already encoded; and
    referring to the stored data and using intra-prediction to encode blocks in a current picture following the first picture,
    wherein the storing the data comprises:
        calculating k similarity values by comparing each pixel data of a first horizontal line of each of k previously encoded pictures with pixel data of a first horizontal line of the current picture, wherein k is a natural number greater than one;
        selecting one of the k previously encoded pictures as corresponding to a biggest similarity value of the k calculated similarity values; and
        storing pixel data of a first horizontal line of the selected previously encoded picture as third reference data, and wherein the referring to the stored data and using intra-prediction to encode the blocks in the current picture comprises:
loading the third reference data; and
intra-predicting a block comprising pixels of the first horizontal line of the current picture based on the third reference data.

2. The method of encoding according to claim 1, wherein the first picture immediately precedes the current picture.

3. A method of encoding video data comprising a plurality of pictures, the method comprising:
storing data of at least one picture in the video data that is already encoded; and
referring to the stored data and using intra-prediction to encode blocks in a current picture,
wherein storing the data comprises:
calculating an average value of pixel data values of a first horizontal line of a first picture, the first picture immediately preceding the current picture; and
storing the calculated average value, and
wherein the referring to the stored data and using intra-prediction to encode blocks in a current picture comprises:
loading the calculated average value; and
intra-predicting a block comprising pixels of a first horizontal line of the current picture based on the calculated average value.

4. An apparatus for encoding a video data using intra-prediction, comprising:
a frame memory for storing data of at least one preceding picture; and
an intra-predicting unit for receiving the data of the at least one preceding picture from the frame memory, and for performing intra-prediction encoding on a current picture following the at least one preceding picture,
wherein the intra-predicting unit comprises:
a line memory configured to store the data of the at least one preceding picture received from the frame memory; and
a block prediction encoding unit configured to perform the intra-prediction encoding on blocks in the current picture based on the data stored in the line memory,
wherein the intra-predicting unit further comprises an average calculating unit that is configured to:
store an initial value in the line memory, when the current picture is a first picture of the video data; and
divide a first line of an immediately preceding picture that immediately precedes the current picture into m sections (m is a natural number greater than one), calculate an average value of pixel data for each of the m sections, and store average values in the line memory, when the current picture is not the first picture of the video data.

5. The apparatus of claim 4, wherein the frame memory is configured to store data of an immediately preceding picture that immediately precedes the current picture, and is configured to transfer the stored data to the intra-predicting unit.

6. The apparatus of claim 4, wherein the intra-predicting unit is configured to:
store an initial value in the line memory, when the current picture is the first picture of the video data; and
store pixel data of a first line of an immediately preceding picture that immediately precedes the current picture in the line memory, when the current picture is not the first picture of the video data.

* * * * *